(12) United States Patent
van Dijk

(10) Patent No.: US 10,323,972 B1
(45) Date of Patent: Jun. 18, 2019

(54) COMBINATION TEMPERATURE AND LOW WATER SENSOR

(71) Applicant: Thomas J. van Dijk, Williamsport, PA (US)

(72) Inventor: Thomas J. van Dijk, Williamsport, PA (US)

( * ) Notice: Subject to any disclaimer, the term of this patent is extended or adjusted under 35 U.S.C. 154(b) by 110 days.

(21) Appl. No.: 15/414,331

(22) Filed: Jan. 24, 2017

Related U.S. Application Data

(60) Provisional application No. 62/286,517, filed on Jan. 25, 2016.

(51) Int. Cl.
  *G01F 23/00* (2006.01)
  *G01F 23/24* (2006.01)
  *G01K 7/22* (2006.01)

(52) U.S. Cl.
  CPC ........ *G01F 23/0076* (2013.01); *G01F 23/242* (2013.01); *G01K 7/22* (2013.01)

(58) Field of Classification Search
  CPC .................. G01F 23/0076; G01F 23/242
  See application file for complete search history.

(56) References Cited

U.S. PATENT DOCUMENTS

| 5,178,009 | A | * | 1/1993 | Arekapudi | ............ | G01F 23/241 137/389 |
| 5,318,363 | A | * | 6/1994 | Mauric | .................... | G01K 1/14 174/70 R |
| 7,836,761 | B2 | * | 11/2010 | Tonner | .................. | G01F 23/242 73/295 |
| 7,891,572 | B1 | * | 2/2011 | Murray | .................. | F22B 37/46 236/21 B |
| 8,410,948 | B2 | * | 4/2013 | Vander Horst | ......... | G01F 23/24 340/531 |

* cited by examiner

*Primary Examiner* — David Z Huang
(74) *Attorney, Agent, or Firm* — Robert J. Yarbrough; Lipton, Weinberger & Husick

(57) ABSTRACT

A combination temperature and low water sensor includes a body configured to penetrate the wall of a hydronic furnace. A detection tip is attached to the body and extends into the furnace when the temperature sensor penetrates the wall. The detection tip is electrically conductive and defines a tip interior volume. A temperature sensor is disposed within the interior volume of the detection tip. Both the detection tip and the temperature sensor are configured for electrical connection to a furnace control system.

12 Claims, 6 Drawing Sheets

COMBINATION TEMPERATURE AND LOW WATER SENSOR

I. RELATED APPLICATIONS

Figure 1:
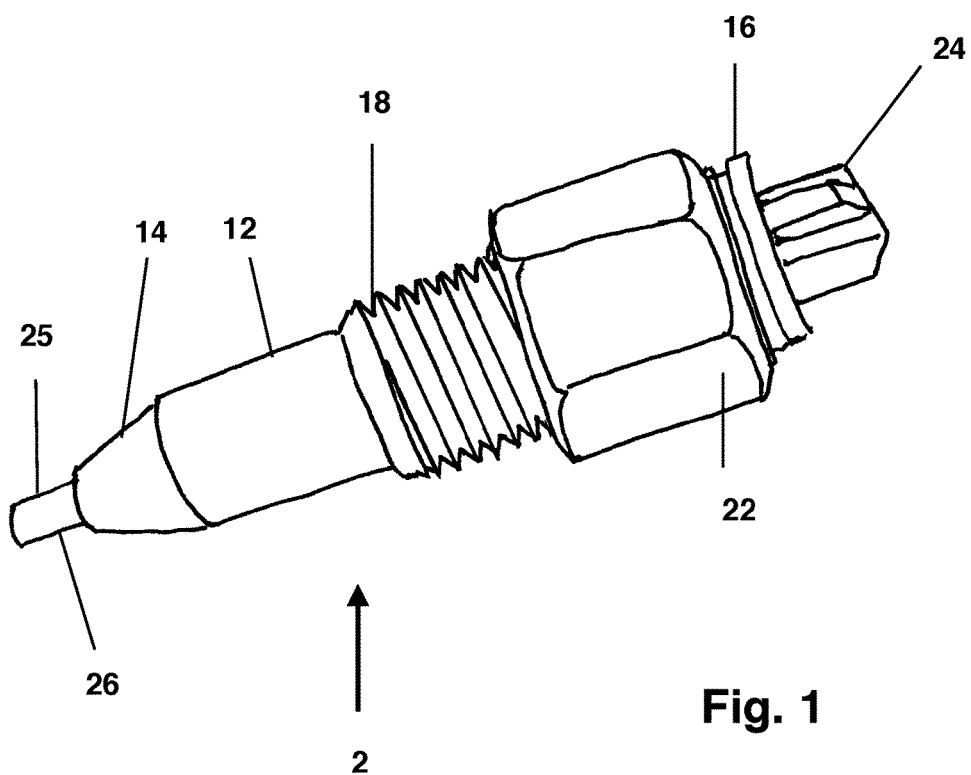

This application claims priority from U.S. Provisional Patent Application 62/286,517 filed Jan. 24, 2016, entitled 'Combination Temperature and Low Water Sensor," which is hereby incorporated by reference as if set forth in full herein.

II. BACKGROUND OF THE INVENTION

A. Field of the Invention

The invention is a sensor for use in hot water heating system furnaces. The sensor detects both the temperature of water inside the furnace and also whether water is present in the furnace at the sensor. The combination sensor of the Invention may be used in any system where monitoring of the presence of water and also the temperature of the water is needed.

B. Statement of the Related Art

Hydronic heating systems utilize heated water or steam flowing through pipes from a central furnace to supply building heat. The firing of the furnace is only needed if the control system requires building heat and if the temperature of the water in the furnace is below a target temperature. If a water temperature sensor malfunctions, the sensor may mislead the control system into providing no building heat or may mislead the control system into overheating and damaging the furnace.

Hydronic furnaces depend upon the water in the furnace to absorb and distribute heat from the firing of the furnace. A leak in the hydronic heating system may cause the water level in the furnace to fall, resulting in a low-water condition. If a hydronic furnace experiences an undetected low water condition, temperature sensors may not function properly to control the temperature within the furnace, which may cause local overheating and damage to the furnace.

The prior art does not teach the sensor of the Invention.

III. BRIEF DESCRIPTION OF THE INVENTION

The Invention is a compact sensor that detects both the temperature of a liquid and also whether the sensor is immersed in the liquid. The sensor may be used for any system requiring detection of both whether an electrically conductive liquid is present and the temperature of the liquid. The sensor has particular application in hydronic furnaces for the heating of water. The remainder of this document describes the combination sensor of the Invention in the context of a furnace for heating a building utilizing liquid water as a heat transfer medium.

The combination sensor of the Invention communicates through a wall of the furnace from a dry, low-pressure area (referred to herein as the 'outside' of the wall) to a wet, relatively high-pressure and relatively high-temperature area (referred to herein as the 'inside' of the wall). In the ordinary operation of the furnace, water is present on the inside of the wall and is not present on the outside of the wall. The sensor features a body that is not electrically conductive, such as a body composed of a non-conductive plastic. When the combination sensor is installed in the wall of the furnace, a first portion of the body extends into the water on the inside the furnace. The second portion of the body remains on the outside of the wall.

The body is configured for a sealable penetration of the wall. The configuration for sealable penetration may be that the body has external threads for engagement with a threaded hole communicating through the wall. Opposing flats on the body allow a technician to install or uninstall the sensor in the threaded hole using a wrench. An electrical connector block is disposed on the second portion of the plastic body and so remains on the outside of the wall. Any other suitable means for sealable penetration by the body through the wall is contemplated by the Invention; for example, the use of a threaded nut engaging external threads on the body, a spring clip, an interference fit, an expanding anchor or an adhesive.

To detect whether water is present on the inside of the wall, the combination sensor includes an electrode to allow an electrical connection between a control system and the water on the inside of the wall. The electrode is attached to the first portion of the body and extends into the water on the inside of the wall when the combination sensor penetrates the wall.

The electrode may be a detection tip. The detection tip is composed of a thermally and electrically conductive material, such as stainless steel. The detection tip is hollow and defines a tip interior volume. The body also defines a body interior volume. The tip interior volume communicates with the body interior volume and the body and tip interior volumes are water tight against intrusion of water from the inside of the wall when the combination sensor penetrates the wall.

The detection tip may be in the shape of a hollow cylinder, with the hollow cylinder closed on one end and open on the other end. The hollow cylinder defines a flange at the open end. An O-ring is disposed over the hollow cylinder adjacent to the flange. The first portion of the body contains a hole sized to receive the detection tip. The interior volume of the body is configured to receive the detection tip and has a surface configured to receive the O-ring and to form a watertight seal between the body and the flange of the detection tip.

A clamping member has an external thread that is configured for a threaded connection to internal threads defined by the interior volume of the body. The threaded clamping member bears on the flange of the detection tip and presses the flange of the detection tip, and hence the O-ring, against the corresponding mating surface on the interior volume of the body. The threaded clamping member therefore holds the detection tip in a watertight engagement with the body, even in the high-pressure, high temperature environment inside the furnace.

The threaded clamping member is composed of an electrically conductive material, such as brass or copper. Because the threaded clamping member is conductive and in contact with the stainless steel detection tip, the threaded clamping member is in electrical communication with the stainless steel detection tip and hence is in electrical communication with water in which the stainless steel detection tip is immersed. An electrode wire is electrically connected to the threaded clamping member, as by soldering the wire to the threaded clamping member. The other end of the electrode wire is attached to one of the connectors of a connector block. The connector block is attached to the second portion of the body and is outside the wall when the body penetrates the wall. The connector block is configured for electrical connection of the electrode to the control system.

The electrical connection between the connector block and the detection tip through the clamping member allows the combination sensor to act as a low-water detector. The control system for the furnace can provide a voltage to the connector and hence to the detection tip and observe the electrical characteristics of the connection between the detection tip and the water. If those electrical characteristics change in a manner consistent with the absence of water, the control system will conclude that a low water condition exists and take appropriate steps, such as shutting down the furnace.

The combination sensor also includes one or more temperature sensors. The temperature sensors may use any available technology, such as thermistors, thermocouples, resistance thermometers or silicon band gap temperature sensors. The temperature sensors are located within the tip interior volume. The thermally conductive detection tip conveys heat to and from the temperature sensors, providing quick response by the temperature sensors to changes in the temperature of the water on the inside of the wall. The temperature sensors are electrically connected to the connector block through the body interior volume. The connector block is electrically connected to the control system. The temperature sensors inform the control system of the temperature of the water inside the wall. The control system will cause the furnace to take appropriate action in response to the temperature information, such as ordering firing of the furnace when the temperature is low or ordering the cessation of firing when the temperature is high.

The temperature sensors may comprise one or two thermistors. Where the connector block has four electrical connectors, three connectors may be used to connect the control system to the two thermistors. The two thermistors are connected by three wires to the three connectors. The common leads of the two thermistors share a wire, eliminating one wire and one connector. The two thermistors are disposed in the interior volume of the hollow cylinder defined by the detection tip, with the three wires passing through the interior of the body.

The temperature of the two thermistors, and hence the resistance of each of the two thermistors, varies with the temperature of the stainless steel detection tip within which the two thermistors are disposed. The two thermistors therefore detect the temperature of the water into which the detection tip is immersed.

The use of two thermistors allows the control system to compare the results of the two thermistors to determine whether a discrepancy exists in the temperatures detected by the thermistors. If there is a discrepancy, then the control system may conclude that at least one of the thermistors is reporting erroneous results and the sensor may require service or replacement. Alternatively, use of two independent thermistors allows the control system to treat one thermistor as the primary thermistor and the other as a backup.

The assembled sensor is 'potted;' that is, the hollow interior of the body and the hollow cylinder of the detection tip are filled completely with a sealant such as epoxy resin to protect the components of the sensor from water, heat, pressure and vibration.

IV. BRIEF DESCRIPTION OF THE DRAWINGS

Figure 2:
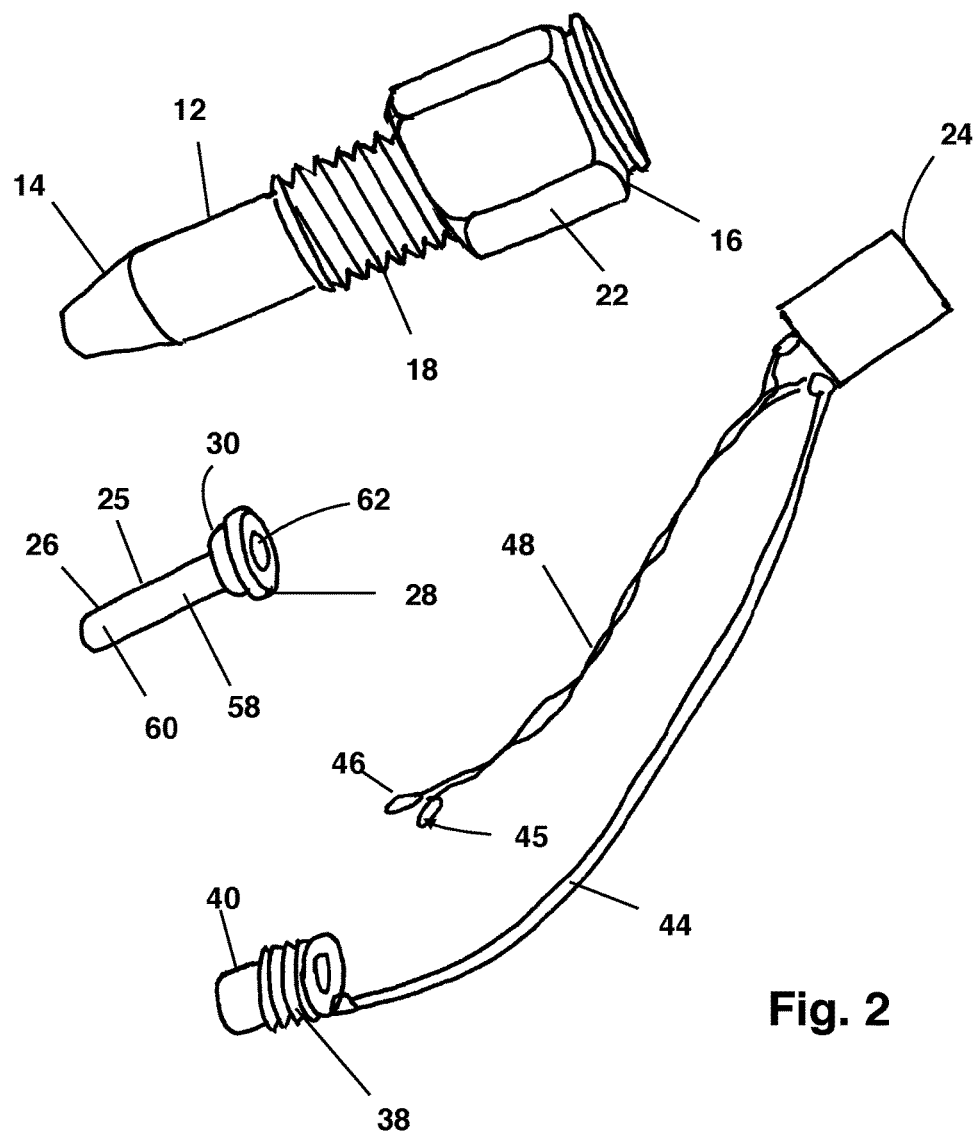
Figures 3, 4:
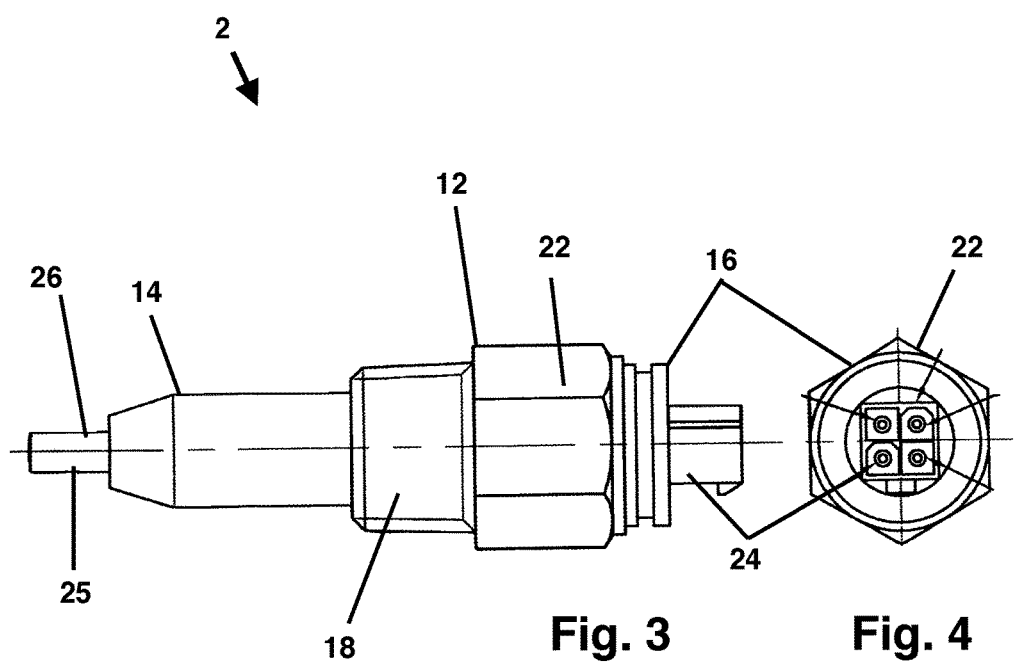
Figure 5:
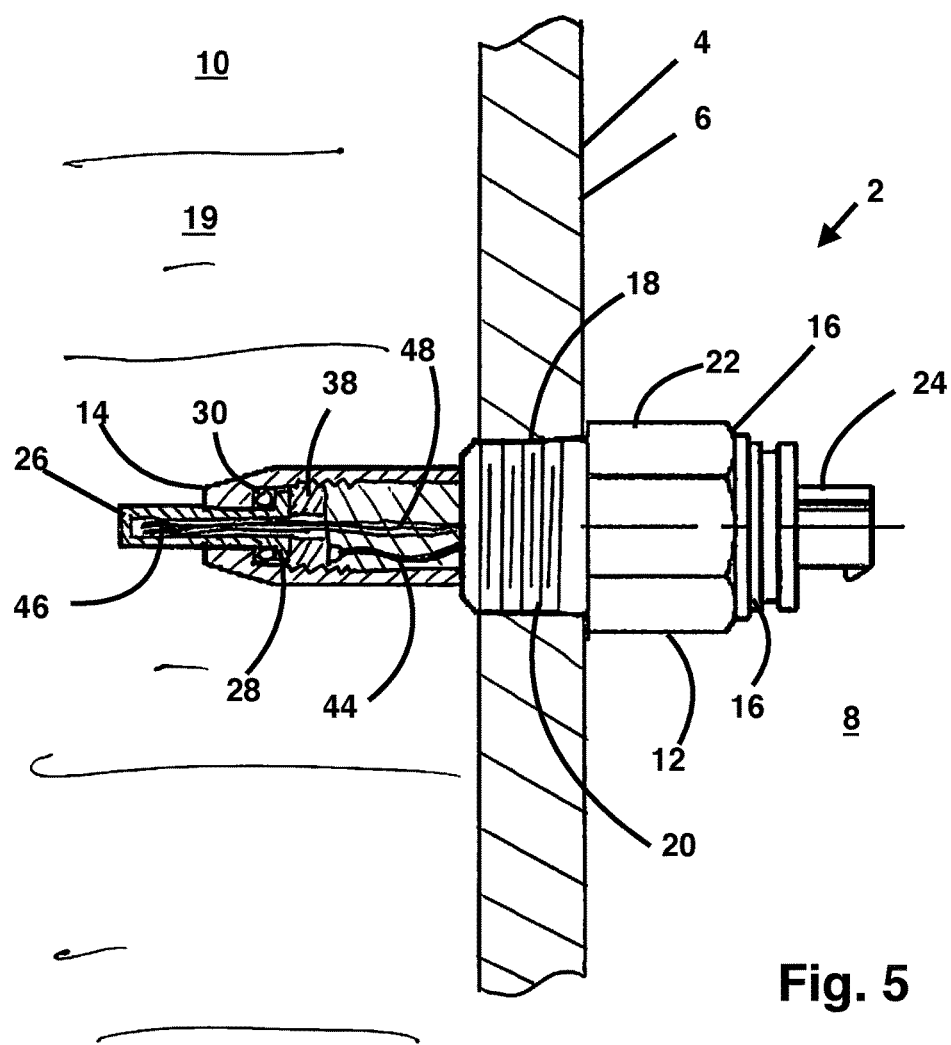
Figure 6:
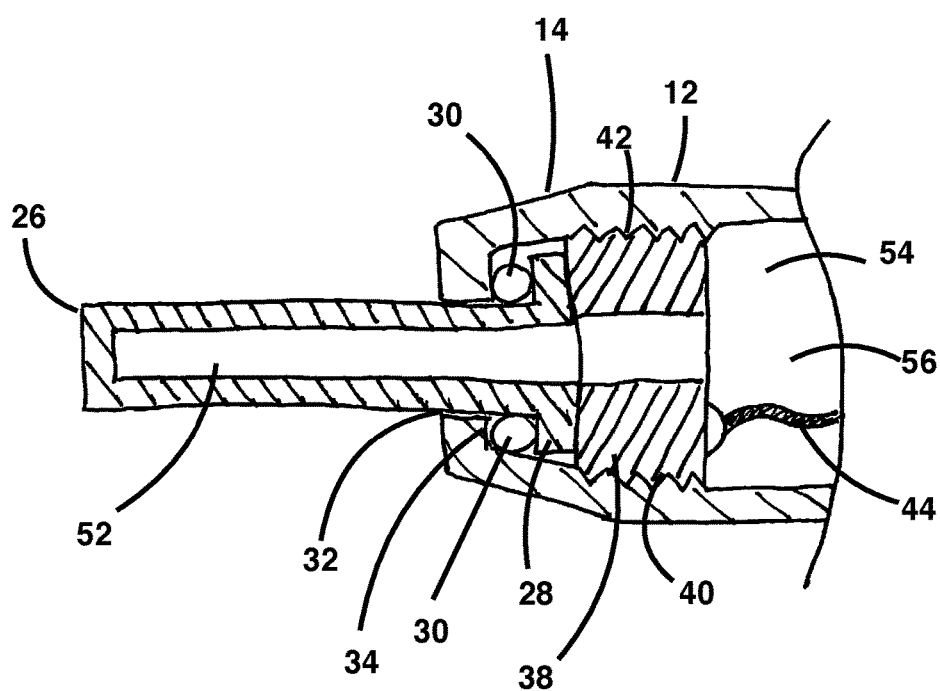
Figure 7:
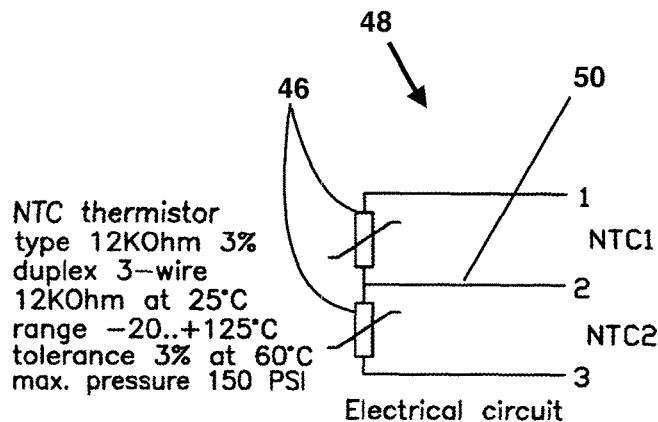
Figure 8:
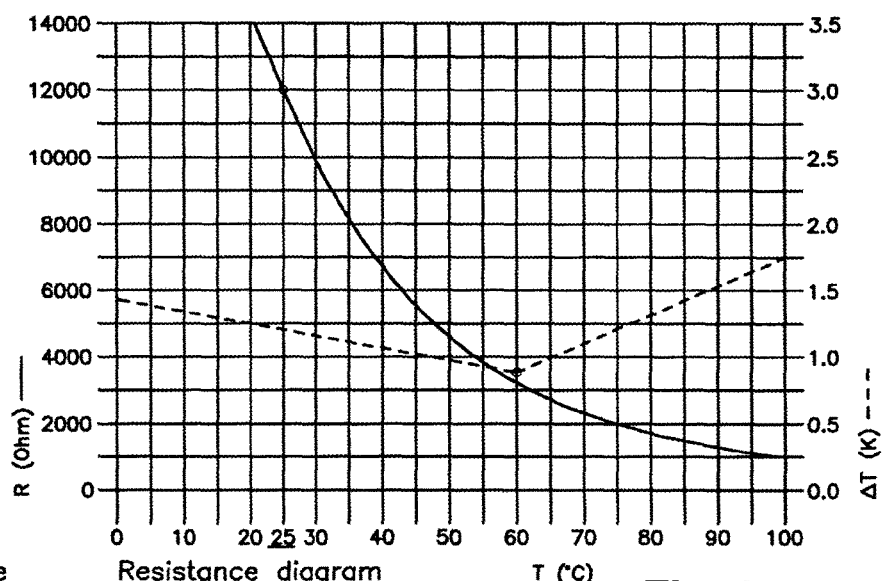

FIG. 1 is a photograph of the combination sensor.
FIG. 2 is a photograph of the components of the combination sensor.
FIG. 3 is a plan view of the combination sensor.
FIG. 4 is an end view of the combination sensor.
FIG. 5 is a partial section view of the combination sensor.
FIG. 6 is a detailed section view of the detection tip assembly.
FIG. 7 is an electrical diagram of the two thermistors.
FIG. 8 is a graph of temperature vs. resistance for the two thermistors.

V. DESCRIPTION OF AN EMBODIMENT

The combination sensor 2 is illustrated by the photograph of FIG. 1 and by the drawings of FIGS. 3, 4 and 5. FIG. 5 illustrates the combination sensor penetrating a wall 4 of a furnace 6.

From the photograph of FIG. 1 and the drawings of FIGS. 3, 4 and 5, the combination sensor 2 has a body 12 that defines a first portion 14 and a second portion 16. An electrode 25 is attached to the first portion 14 of the body 12. The electrode 25 is configured for electrical communication with the water 19 on the inside 10 of the wall 4 (FIG. 5). The electrode 25 may be in the form of an electrically and thermally conductive detection tip 26. The detection tip 26 is disposed at the first portion 14 of the body 12. A connection block 24 with wire connections is disposed on the second portion 16 of the body 12. The connection block 24 is configured for electrical connection to the electrode 25 and for electrical connection to a control system for the furnace 6. The body 12 is electrically non-conducting and may be composed of plastic.

From FIG. 5, a furnace 6 for heating water 19 has a wall 4. The wall 4 separates the inside 10 of the wall 4 containing water 19 at a relatively high temperature and pressure during normal operation of the furnace 6 from the outside 8 of the wall 4 that is not wetted by water 19 during normal operation and that is at a relatively low temperature and pressure compared to the inside 10. A threaded hole 20 penetrates the wall 4 from the outside 8 to the inside 10. The threads of the threaded hole 20 mate with external threads 18 on the body 18 to sealably attach the combination sensor 2 to the wall 4 in a watertight manner. Opposing flats 22 defined by the second portion 16 of the body 12 allow a technician to install or remove the combination sensor 2 using a wrench. The opposing flats 22 may be hexagonal.

When the threads 18 of the sensor body 12 mate with the threaded hole 20, the first portion 14 of the body 12 is disposed on the inside 10 of the wall 4 and is exposed to water 19 at relatively high pressure and temperature during normal operation. The second portion 16 of the body 12 is disposed on the outside 8 of the wall 4 at relatively low pressure and temperature and is dry during normal operation. Electrical leads (not shown) attach the electrical connector block 24 to the control system for the furnace 6.

FIG. 2 shows the disassembled components of the combination sensor 2. The cross section of FIG. 5 and the detail cross section of FIG. 6 illustrate the relative location and function of those components in the assembled combination sensor 2. From FIGS. 2, 5 and 6, the detection tip 26 is a hollow cylinder 58 that has a closed end 60 and an open end 62. The detection tip 26 defines a flange 28 at the open end 62. The detection tip 26 is preferably composed of stainless steel for durability and electrical and thermal conductivity, but any electrically and thermally conductive material may be used. An O-ring 30 encircles the detection tip 26 adjacent to the flange 28. A clamping member 38 is in the shape of a hollow cylinder with external threads 40. A wire 44 electrically connects the clamping member 38 to a terminal of the electrical connector block 24.

The temperature detection functions of the combination sensor 2 are carried out by one or more temperature sensors 45. The temperature sensor 45 may comprise two thermistors 46, shown by FIGS. 2, 5 and 7, which are disposed inside the tip interior volume 52 of the hollow cylinder 58 of the detection tip 26. As noted, the temperature sensors 45 are not limited to thermistors 46 and may utilizes any suitable technology. In use, the two thermistors 46 are connected to the furnace control system through the connector block 24. A single thermistor 46 may be used rather than a pair of thermistors 46.

FIG. 7 is an electrical diagram of the two thermistors 46 of the combination sensor 2. The two thermistors 46 are connected to the electrical connector block 24 by three wires 48, which are also shown by FIGS. 2 and 7. The common leads 50 of both thermistors 46 are attached to the connector block 24 by a single wire. As shown by the graph of FIG. 8, the electrical resistance of each of the two thermistors 46 varies as a function of the temperature in a known relation. The furnace control system thus can determine the temperatures of the thermistors 46 by their electrical resistance. Since the two thermistors 46 are disposed within the tip interior volume 52 of the thermally-conductive detection tip 26 as shown by FIG. 5, the temperature of the thermistors 46 indicates the temperature of the detection tip 26 and hence of the water 19 in which the detection tip 26 is immersed.

The use of two separately wired thermistors 46 allows the control system to compare the results of the two thermistors 46. If the control system determines that the two thermistors 46 are in disagreement and indicate different temperatures, the control system can conclude that the system requires maintenance and perhaps the combination sensor 2 requires replacement. Alternatively, the control system can treat one of the thermistors 46 as the reference temperature and the other thermistor 46 as a backup.

FIG. 6 illustrates the low-water detection portion of the combination sensor 2. The components of the combination sensor 2 to detect a low water 19 condition are the detection tip 26, the body 12, the clamping member 38, and the wire 44 electrically connected the clamping member 38 to the connector block 24. In FIG. 6, the thermistors 46 and the wiring 48 for the thermistors 46 are omitted for clarity. As shown by FIG. 6, the external threads 40 of the clamping member 38 engage internal threads 42 on the interior volume 54 of the body 12 at the first portion 14. The clamping member 38 presses the flange 28 of the detection tip 26 against the O-ring 30, and in turn the O-ring 30 presses against the mating surface 34 on the interior volume 54 of the body 12 at the first portion 14. The engagement between the clamping member 38, flange 28, O-ring 30 and surface 34 causes the penetration of the detection tip 26 through the hole 32 in the first portion 14 of the plastic body 12 to be watertight.

The clamping member 38 is composed of an electrically conductive material, such as brass, copper or stainless steel, and the engagement between the detection tip 26 and the conductive clamping member 38 is electrically conductive. The control system for the furnace 6 can apply an electrical potential to the connector block 24 and through the electrode wire 44 to the clamping member 38 and hence to the detection tip 26. The control system will look for an electrical response consistent with the immersion of the detection tip 26 in water 19. If the control system does not observe that response, the control system will conclude that the detection tip 26 is not immersed in water 19 and that a low-water 19 condition exists. The control system will take appropriate action, such as shutting down the furnace 6.

The body interior volume 54 and the tip interior volume 52 are potted by filling the body and tip interior volumes 54, 52 with a sealant 56 such as epoxy resin, as shown by FIG. 6, to protect the combination sensor 2 and its components from water, pressure and vibration.

LIST OF NUMBERED ELEMENTS

The following list of numbered elements as referred to in the drawings, claims and specification.
2 combination sensor
4 a wall
6 a furnace
8 an outside
10 an inside
12 a body
14 a first portion inside the furnace
16 a second portion outside the furnace
18 external threads of the body
19 a water
20 a threaded hole
22 a pair of opposing flats
24 a connector block
25 an electrode
26 a detection tip
28 a flange
30 an O-ring
32 a hole sized to receive the detection tip
34 a mating surface
38 a clamping member
40 an external thread of the clamping member
42 internal threads defined by the interior of the plastic housing to engage the clamping member
44 an electrode wire
45 a temperature sensor
46 a pair of thermistors
48 three wires
50 common leads of the two thermistors
52 tip interior volume
54 body interior volume
56 a sealant
58 hollow cylinder
60 closed end
62 open end

I claim:

1. A combination sensor for detecting low water and for detecting a temperature of the water in a furnace of a hydronic heating system, the furnace having a wall separating an outside and an inside of the furnace, the inside of the furnace having liquid water present during normal operation, the outside of the furnace not having liquid water present during normal operation, the combination sensor comprising:

a) a body, said body being electrically non-conductive, said body having a configuration to sealably penetrate the wall, said body defining a first portion and a second portion, said first portion being disposed inside the furnace when said body penetrates the wall, said second portion being disposed outside the furnace when said body penetrates the wall, said body defining a body interior volume and a body inside surface, said body defining a hole, said hole communicating between said body interior volume and the inside of the furnace when said body penetrates the wall;

b) a detection tip in a shape of a hollow cylinder having a closed end and an open end and defining a tip interior volume, said tip interior volume communicating with said body interior volume, said detection tip being electrically conductive, said detection tip extending from said first portion of said body into the water inside the furnace when said body penetrates the wall, said open end of said detection tip defining a flange, said closed end of said detection tip penetrating said hole defined by said body with said flange disposed in said body interior volume;
c) an O-ring being disposed between said flange and said body inside surface;
d) a clamping member, said clamping member having an external thread, said external thread of said clamping member engaging a corresponding internal thread of said body, said clamping member in combination with said internal thread of said body being configured to bear upon said flange and to clamp said O-ring between said flange and said body inside surface, whereby said attachment of said electrode to said body is water tight;
e) a temperature sensor attached to said body and disposed inside the furnace when said body penetrates the wall, said temperature sensor being disposed within said tip interior volume, said detection tip and said temperature sensor having a configuration for electrical communication with a control system for control of the furnace, whereby when said detection tip and said temperature sensor are connected to said control system and said body penetrates the wall, said detection tip and said temperature sensor inform said control system of the presence or absence of water and the temperature of the water on the inside of the furnace, said body interior volume and said tip interior volume being water tight to the water inside the furnace when said body penetrates the wall.

2. The combination sensor of claim 1 wherein said configuration for electrical communication with said control system comprises: an electrode wire, said electrode wire being mechanically attached to said clamping member, said clamping member being electrically conductive, said clamping member being in electrical communication with said detection tip.

3. The combination sensor of claim 2 wherein said configuration for electrical communication with said control system further comprising: a connector block, said connector block being disposed on said second portion of said body, said connector block being on the outside of the furnace when said body penetrates the wall, said connector block being configured for selectable connection to said control system, said electrode wire being electrically attached to said connector block.

4. The combination sensor of claim 3 wherein said temperature sensor is a thermistor, said thermistor being electrically connected to said connector block by a first and a second thermistor wire.

5. The combination sensor of claim 4 wherein said thermistor is a one of a pair of thermistors, both of said pair of thermistors being disposed within said tip interior volume, each of said pair of thermistors being electrically connected to said connector block for connection to said control system.

6. The combination sensor of claim 5 wherein said control system is configured for electrical connection to said connector block, said control system being configured to be informed by said pair of thermistors in cooperation to determine the temperature of the water.

7. The combination sensor of claim 5 wherein said control system is configured for electrical connection to said connector block, said control system being configured to be informed by either of said pair of thermistors to determine the temperature of the water.

8. The combination sensor of claim 4 wherein said body interior volume is potted, whereby said body interior volume is sealed by a sealant.

9. The combination sensor of claim 8 wherein said configuration of said body to sealably penetrate said wall comprises: an external thread defined by said body, said external thread being configured to engage an internal thread defined by said wall.

10. The combination sensor of claim 9 wherein said configuration of said body to sealably penetrate said wall comprises: a pair of opposing flat surfaces defined by said second portion of said body wherein said body is turnable when said internal and external threads are in threaded engagement by engaging said flat surfaces with a wrench.

11. A combination sensor for detecting liquid and for detecting a temperature of the liquid in a system, the system having a wall separating an outside and an inside of the system, the inside of the system having an electrically conductive liquid present during normal operation, the outside of the system not having the electrically conductive liquid present during normal operation, the combination sensor comprising
a) a body, said body being electrically non-conductive, said body having a configuration to sealably penetrate the wall, said body defining a first portion and a second portion, said first portion being disposed inside the system when said body penetrates the wall, said second portion being disposed outside the system when said body penetrates the wall, said body defining a body interior volume and a body inside surface, said body defining a hole, said hole communicating between said body interior volume and the inside of the system when said body penetrates the wall;
b) a detection tip, said detection tip being in a shape of a hollow cylinder having a closed end and an open end and defining a tip interior volume, said tip interior volume communicating with said body interior volume, said detection tip being electrically conductive, said detection tip extending from said first portion of said body into the liquid inside the system when said body penetrates the wall, said open end of said detection tip defining a flange, said closed end of said detection tip penetrating said hole defined by said body with said flange disposed in said body interior volume;
c) an O-ring being disposed between said flange and said body inside surface;
d) a clamping member, said clamping member having an external thread, said external thread of said clamping member engaging a corresponding internal thread of said body, said clamping member in combination with said internal thread of said body being configured to bear upon said flange and to clamp said O-ring between said flange and said body inside surface, whereby said attachment of said electrode to said body is liquid tight;
e) a temperature sensor attached to said body and disposed inside the system when said body penetrates the wall, said temperature sensor being disposed within said tip interior volume, said detection tip and said temperature sensor having a configuration for electrical communication with a control system for control of the system, whereby when said detection tip and said temperature sensor are connected to said control system and said body penetrates the wall, said detection tip and said temperature sensor inform said control system of the presence or absence of liquid and the temperature of the liquid on the inside of the system, said body interior volume and said tip interior volume being liquid tight to the liquid inside the system when said body penetrates the wall.

12. The combination sensor of claim 11 wherein said configuration for electrical communication with said control system comprises: an electrode wire, said electrode wire being mechanically attached to said clamping member, said clamping member being electrically conductive, said clamping member being in electrical communication with said detection tip.

* * * * *